(12) United States Patent
Schluesselberger (10) Patent No.: US 10,380,907 B2
(45) Date of Patent: Aug. 13, 2019

(54) DEVICE FOR SPATIALLY MOVING PERSONS

(75) Inventor: Richard Schluesselberger, Braunau am Inn (AT)

(73) Assignee: AMST-Systemtechnik GmbH, Ranshofen (AT)

(*) Notice: Subject to any disclaimer, the term of this patent is extended or adjusted under 35 U.S.C. 154(b) by 1195 days.

(21) Appl. No.: 14/119,641

(22) PCT Filed: May 21, 2012

(86) PCT No.: PCT/EP2012/059364
§ 371 (c)(1),
(2), (4) Date: Nov. 22, 2013

(87) PCT Pub. No.: WO2012/160022
PCT Pub. Date: Nov. 29, 2012

(65) Prior Publication Data
US 2014/0087334 A1  Mar. 27, 2014

Related U.S. Application Data

(60) Provisional application No. 61/489,065, filed on May 23, 2011.

(30) Foreign Application Priority Data

May 23, 2011  (AT) .................................. A 739/2011

(51) Int. Cl.
G09B 9/02 (2006.01)
G09B 9/14 (2006.01)
A63G 31/16 (2006.01)

(52) U.S. Cl.
CPC .............. *G09B 9/02* (2013.01); *A63G 31/16* (2013.01); *G09B 9/14* (2013.01)

(58) Field of Classification Search
CPC .............. G09B 9/02; G09B 9/12; G09B 9/14
See application file for complete search history.

(56) References Cited

U.S. PATENT DOCUMENTS 3,196,557 A * 7/1965 Davidsen ................. G09B 9/12
434/55
4,162,582 A  7/1979 McGraw et al.
(Continued)

FOREIGN PATENT DOCUMENTS

EP  0965968 A2  12/1999
FR  2687491 A1  8/1993
(Continued)

*Primary Examiner* — James B Hull
*Assistant Examiner* — Sadaruz Zaman
(74) *Attorney, Agent, or Firm* — Laurence A. Greenberg; Werner H. Stemer; Ralph E. Locher (57) ABSTRACT

A device for spatially moving persons includes a first support element, which includes a retaining device for at least one person and which is rotatable about a first rotational axis relative to a second support element. A second support element rotatably mounted about a second rotational axis relative to a third support element. The first rotational axis and the second rotational axis are substantially orthogonal to each other. The device further includes an image playback surface. The retaining device has at least one rotational degree of freedom relative to the image playback surface.

19 Claims, 8 Drawing Sheets

(56) References Cited

U.S. PATENT DOCUMENTS

| | | | | |
|---|---|---|---|---|
| 4,402,500 A * | 9/1983 | Coles | A63B 19/04 | |
| | | | 434/55 | |
| 4,824,099 A * | 4/1989 | Rusu | A63G 31/00 | |
| | | | 434/55 | |
| 5,052,932 A * | 10/1991 | Trani | G09B 9/32 | |
| | | | 434/29 | |
| 5,060,932 A * | 10/1991 | Yamaguchi | A63G 31/16 | |
| | | | 434/34 | |
| 5,433,608 A * | 7/1995 | Murray | G09B 9/14 | |
| | | | 434/29 | |
| 5,490,784 A * | 2/1996 | Carmein | A63B 22/02 | |
| | | | 434/29 | |
| 5,980,256 A * | 11/1999 | Carmein | A63B 22/02 | |
| | | | 434/29 | |
| 6,283,758 B1 | 9/2001 | Waller | | |
| 6,705,174 B2 * | 3/2004 | Tippett | F03G 3/00 | |
| | | | 74/5.37 | |
| 8,579,714 B2 * | 11/2013 | Trui | A63G 31/00 | |
| | | | 472/57 | |
| 2004/0077464 A1 * | 4/2004 | Feldman | A63B 22/0007 | |
| | | | 482/57 | |
| 2008/0039216 A1 * | 2/2008 | Higashiguchi | A63F 13/08 | |
| | | | 463/47 | |
| 2009/0228144 A1 * | 9/2009 | Okazaki | B25J 9/1692 | |
| | | | 700/245 | |
| 2010/0186527 A1 * | 7/2010 | Silver | F03H 99/00 | |
| | | | 74/64 | |
| 2011/0045446 A1 | 2/2011 | Glaser et al. | | |
| 2011/0282588 A1 | 11/2011 | Tsypin | | |
| 2012/0282588 A1 * | 11/2012 | Stevens | G09B 9/04 | |
| | | | 434/365 | |
| 2013/0108992 A1 * | 5/2013 | Buelthoff | G09B 9/02 | |
| | | | 434/33 | |

FOREIGN PATENT DOCUMENTS

| | | |
|---|---|---|
| GB | 2474279 A | 4/2011 |
| JP | 3637348 B1 | 4/2005 |
| WO | 2007114639 A1 | 10/2007 |

* cited by examiner

DEVICE FOR SPATIALLY MOVING PERSONS

BACKGROUND OF THE INVENTION

Field of the Invention

The invention relates to a device for the spatial movement of persons comprising: a first support element, which comprises a retention device for at least one person and is disposed rotatably around a first rotational axis with respect to a second support element; a second support element, which is disposed rotatably around a second rotational axis with respect to a third support element, wherein the first rotational axis and the second rotational axis are disposed essentially orthogonal to one another; and an image reproduction surface.

The device is used amongst other things for the simulation of moving systems, such as for example vehicles, ships, aircraft or similar. A virtual reality is simulated for a person located in a hollow body or a cabin by means of a plurality of artificially generated sensory perceptions. These sensory stimuli are on the one hand audiovisual stimuli, which are fed to the user via image reproduction systems and sound reproduction systems. On the other hand, accelerations or forces which act on the user are generated by the generic device. The human brain interprets virtual motion states through the combination of audiovisual and physical sensory impressions. The more precisely the sensory perceptions correspond to the real sensory perceptions of such situations, the more realistic this interpretation becomes for the user. For this reason, it is very important to feed these signals to the user in a manner that is as close to reality as possible.

Furthermore, parameter input units are provided with the present device, by means of which parameter input units the user can control the movements of the moving system in the virtual world.

This control signal of the user and any surrounding influences (wind, roadway, etc.), which can also be regarded as disturbance variables, are fed to a physical simulation model. This corresponds to a mathematical mapping of the real behavior of the simulated object. It contains variables such as mass inertias, resistances, etc. The accelerations or forces and their orientations, which are intended to be fed to the user in the virtual world, are calculated with the aid of this model. This takes place by controlling various drives by means of a control unit.

Devices for the spatial movement of persons, in particular motion simulators and orientation trainers, have long been known.

Devices according to the prior art are for example one-arm centrifuges with gimbal-mounted cabins. With such devices, a cabin rotatable around two rotational degrees of freedom is provided at the outer end of a rotatably disposed arm. Through the rotation of the cabin at a certain normal distance from the rotational axis, the cabin and the person located therein experience centrifugal and tangential accelerations, in addition to gravitational acceleration. The resultant acceleration direction and the variation in the magnitude of the acceleration due to different angular velocities can be used, by means of targeted rotation of the cabin, to simulate certain motion and acceleration states for the person. The two rotational axes of the cabin have a common point of intersection, which usually lies in the region of the person's head.

A further possible application is the provision of a gimbal-mounted cabin in two-arm centrifuges, in particular two-arm centrifuges with a traversable heave carriage. This heave carriage is traversable along the arm and also comprises a translatory heave drive, which enables a motion of the cabin parallel to the main rotational axis of the main arm.

Furthermore, simulators are known that comprise a cabin which is disposed vertically on a hexapod. Apart from gravitational acceleration, the latter have no further means for the static or permanent increase or decrease in the resultant acceleration on the person. Motion states can also be simulated by inclinations and rotations of the cabin, but said motion states predominantly simulate static flight and driving situations.

High acceleration forces occur especially when use is made of gimbal-mounted cabins in one-arm centrifuges. For this reason, the overall mounting and the rotation kinematics have to withstand high forces, and this requires sufficient dimensioning. The sufficient dimensioning is however accompanied by an increase in the size of the device and thus, in turn, an increase in the weight and also an increase in the loading forces.

Furthermore, different gimbal-mountings are used in different simulators.

BRIEF SUMMARY OF THE INVENTION

The problem of the present invention is to overcome the drawbacks of the prior art and:

to create a device as compact as possible for the spatial movement of a person, wherein in particular the arrangement of the support elements for the rotation of the person around at least two degrees of rotational freedom is constituted as compact and small as possible, as a result of which the motion device can advantageously be produced more compact and more cost-effectively, and wherein, moreover, an improved simulation for the person is achieved, in particular a more realistic simulation with fewer disturbing influences in a more compact space.

The problems according to the invention are solved by the fact that the retention device has at least one degree of rotational freedom with respect to the image reproduction surface.

Furthermore, the problem according to the invention is solved by the fact that the third support element is disposed rotatably around a third rotational axis with respect to a motion device, wherein the second rotational axis and the third rotational axis are disposed essentially orthogonal to one another, or that the third support element is connected rigidly to a motion device.

Further features according to the invention are for example that the image reproduction surface is provided on the second support element and is connected to the latter, that the support elements and the motion device in every arbitrary rotational location and position are located outside the visual field of the person, that the rotational axes run essentially through the center and/or that the body of the person, in particular the head, the center of gravity of the body and the heart of the person, is located in the region of the center.

Moreover, features according to the invention can be that the image reproduction surface is constituted essentially following the inner side of a hollow body curved in a concave manner around the retention device, that the hollow body and/or the image reproduction surface has an essentially closed shape, in particular is constituted as a hollow sphere, as a hollow ellipsoid, segmented in a hollow-sphere shape, segmented in a hollow-body shape, hollow-body shaped or hollow-sphere shaped, that the hollow body comprises an opening for the entry and exit of persons, that the opening is constituted as a closable opening, wherein the closure is preferably constituted such as to complete the shape of the hollow body.

The invention is also characterised in that the motion device is constituted as a one-arm centrifuge, as a centrifuge with a traversable carriage, as a centrifuge with a traversable heave carriage, as a linearly traversable carriage, as a two-arm centrifuge with a carriage traversable on both sides, as a two-arm centrifuge with a heave carriage traversable on both sides, or as a robot arm with at least one rotational and/or translatory degree of freedom, as a hexapod or as a stationary mounting, that at least one control unit and at least one drive are provided for the rotation of the support elements around their respective rotational axes and for driving the motion device, and that at least one drive can be controlled by the control unit, that a first drive is provided for driving the first support element around the first rotational axis, a second drive is provided for driving the second support element around the second rotational axis; and, if appropriate, the third drive is provided for driving the third support element around the third rotational axis and/or that at least one parameter input unit is provided so that the person can influence the control unit, in particular the control of the motion of the support elements and the motion device.

Further solutions for solving the problems according to the invention are that the image reproduction surface is constituted as an image reproduction surface reflecting the image of one or more projectors, or as a flat display screen surface such as for example an OLED display screen surface, a plasma display screen surface or an LCD display screen surface, that the first support element and/or the retention device has a degree of rotational freedom with respect to the image reproduction surface, that the image reproduction surface has at least one degree of freedom with respect to the motion device, that the image reproduction surface and the hollow body are connected fixedly to the second support element and/or that the retention device has at least one fixable degree of freedom with respect to the first support element.

Furthermore, the device is characterised in that the image reproduction surface is fixedly connected to the hollow body or that the inner side of the hollow body is the image reproduction surface, that the first support element is disposed bow-shaped running outside the visual field of the person, that the second support element is constituted ring-shaped, closed hollow-body shaped or partially closed hollow-body shaped, wherein the first support element is connected rotatably around the first rotational axis to the second support element at at least one point, preferably at two points, that the third support element is constituted ring-shaped, closed hollow-body shaped or partially closed hollow-body shaped, wherein the second support element is connected rotatably around the second rotational axis to the third support element at at least one point, preferably at two points, and/or that the third support element is connected rotatably around the third rotational axis to the motion device at at least one point, preferably at two points.

Further solutions to the problem according to the invention are that the rotational axes essentially intersect at a point, or that at least one of the rotational axes has a normal distance from one of the other rotational axes, that the normal distance corresponds to the smallest distance between an eye and/or an organ of equilibrium of the person, that the roll axis and the main rotational axis have essentially one point of intersection in order to simulate a uniform, non-accelerated motion, a stationary position or a quasi-static motion.

Moreover, the invention is characterised in that, in order to simulate a uniform, non-accelerated motion, a stationary position or a quasi-static motion, the first rotational axis corresponds to the yaw axis, the second rotational axis to the pitch axis and the third rotational axis to the roll axis, that the first rotational axis corresponds to the pitch axis, the second rotational axis to the roll axis, and that the rotation around third rotational axis (6) it is blocked, that the first rotational axis corresponds to the pitch axis, the second rotational axis to the yaw axis and the third rotational axis to the roll axis, that the first rotational axis corresponds to the yaw axis, the second rotational axis to the roll axis and the third rotational axis to the pitch axis, that the first rotational axis corresponds to the pitch axis, the second rotational axis to the roll axis and the third rotational axis to the yaw axis and/or that the first rotational axis corresponds to the roll axis, the second rotational axis to the pitch axis and the third rotational axis to the yaw axis.

To Start with, Several Designations Will be Defined in Order to Improve the Clarity:

Field of vision is defined as the region that can be visually perceived with the head held steady and straight and with a motionless gaze directed straight ahead. Moreover, the field of vision is defined as the binocular field of vision, i.e. the field of vision of both eyes. The lateral extension of the field of vision lies at around 180°, the extension upwards at around 60° and the extension downwards at around 70°.

Visual field is defined as the region that corresponds to the field of vision, wherein the visual field is limited in depth by the closest non-transparent body or the closest non-transparent layer. In the case of the present invention, the visual field is limited for example by the image reproduction surface, but also by cockpit elements or items of equipment such as helmets etc.

The field of view is the entire region that can be seen by the person, including with rotation and movement of the head.

The roll axis is defined as the axis that runs along or parallel to the viewing direction with the head held straight and with a motionless gaze directed straight ahead.

The pitch axis is defined as the axis which runs normal to the latter and essentially represents the connecting line between the two eyes or the two ears of a person.

The yaw axis is defined as the axis which runs normal to the two aforementioned axes and, for example, thus essentially follows the vertical body axis of the main extension direction of the spine of a person.

Two rotational axes are orthogonal when their direction vectors are orthogonal. A point of intersection in three-dimensional space is not necessary for this. Two axes can thus also be orthogonal when they are skewed with respect to one another.

BRIEF DESCRIPTION OF THE SEVERAL VIEWS OF THE DRAWING

The invention is described in greater detail below with the aid of several examples of embodiment.

DESCRIPTION OF THE INVENTION

Figure 1:
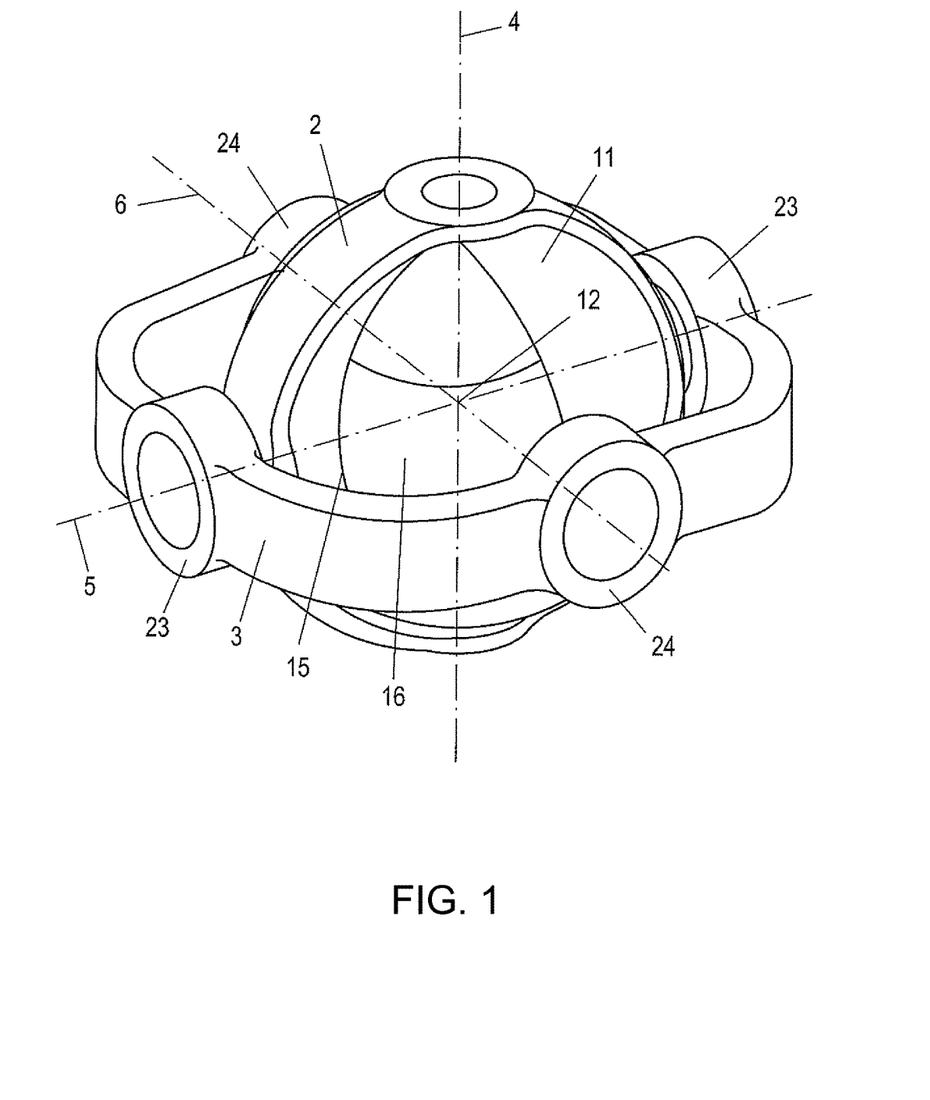
FIG. 1 shows an oblique view of a simulator cabin according to the invention.

FIG. 1 shows an oblique view of a device according to the invention for the spatial movement of persons, in particular a simulator cabin with a third support element 3, on which a second support element 2 is disposed rotatably around second rotational axis 5. Hollow body 11 is connected fixedly to second support element 2. Said hollow body comprises an opening 15 with a closure 16. Third support element 3 comprises a plurality of, in the present case four, rotary connection devices 23, 24. Second rotary connection devices 23 are used for the connection and the drive of second support element 2 with respect to third support element 3. Third rotary connection devices 24 are used for the rotational motion of third support element 3 with respect to motion device 9 (not depicted here).

Furthermore, a first rotational axis 4, a second rotational axis 5 and a third rotational axis 6 are represented diagrammatically. The three rotational axes essentially correspond to the three rotational axes of the rotary connection devices. In the represented basic position, all three rotational axes are orthogonal to one another. The three axes 4, 5, 6 intersect in this embodiment essentially at the point which is disposed in center 12.

Hollow body 11 is constituted spherical and comprises an opening 15 for the entry and exit of a person or as a general hatchway for the transport of objects. Opening 15 can be closed by a closure 16, which is constituted essentially completing the shape of hollow body 11. It is however also perfectly in accordance with the idea of the invention that hollow body 11 is not constituted continuously spherical, but comprises openings, and for example is constituted ellipsoidal, cylindrical or rectangular.

Figure 2:
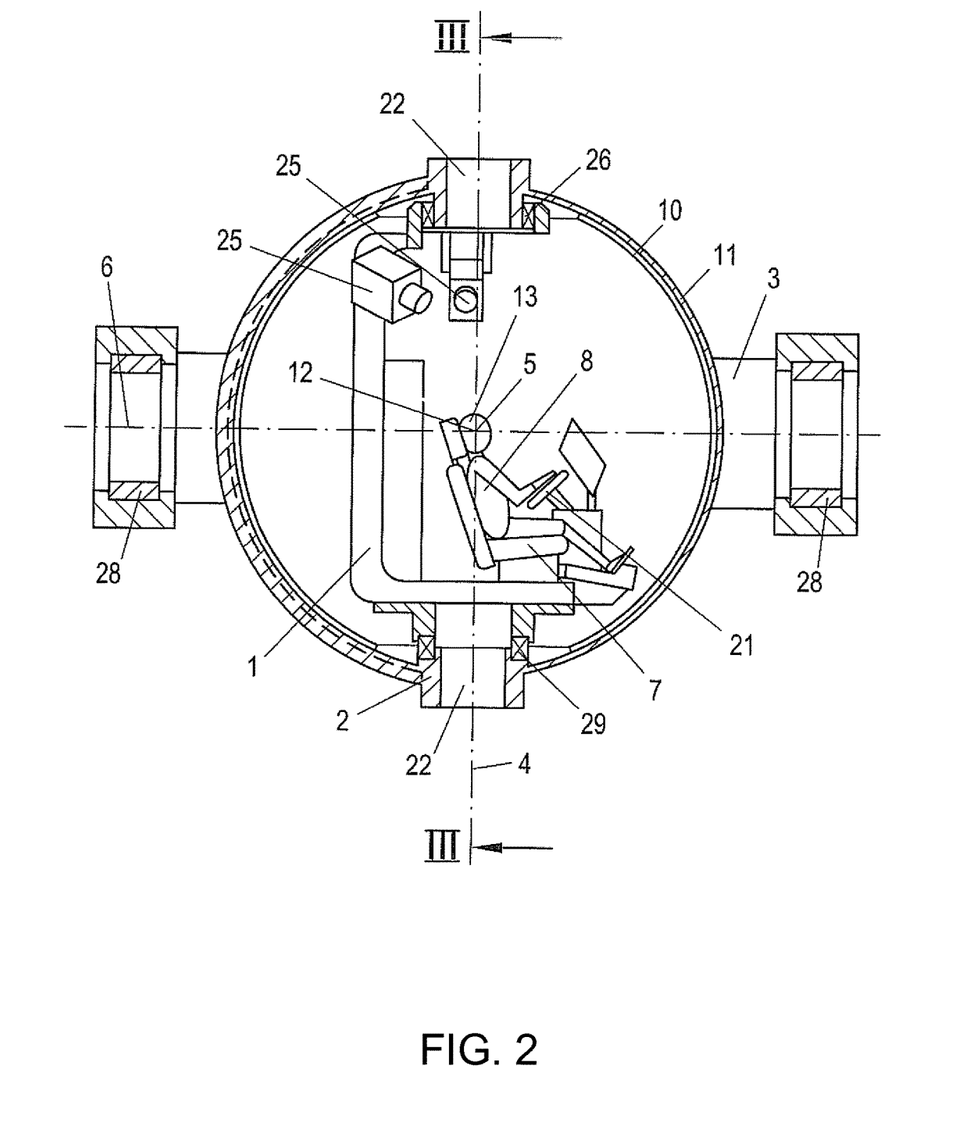
FIG. 2 shows a cross-sectional representation of a simulator cabin according to the invention.

FIG. 2 shows a cross-sectional representation of an embodiment according to the invention. The device for the spatial movement of a person 8, who is located on a retention device 7, comprises a first support element 1 which is connected to retention device 7 and is disposed rotatably around a first rotational axis 4 with respect to a second support element 2. Support element 1 enables a rotation of at least 10°, 20°, 30°, 45°, 90°, 180° or 360°. This rotation can be enabled and actively regulated stepless, limited or unlimited.

Second support element 2 is disposed rotatably around a second rotational axis 5 with respect to third support element 3. Rotational axis 5 runs projecting in this representation and is therefore represented as a point. First rotational axis 4 and second rotational axis 5 run essentially orthogonal to one another. Furthermore, a third support element 3 is provided, which is disposed rotatably around a third rotational axis 6 with respect to a motion device 9 (not represented here), wherein second rotational axis 5 and third rotational axis 6 are disposed essentially orthogonal to one another. Person 8 is held by retention device 7, which in this embodiment is constituted as a seat. Depending on the application of the simulation, this seat and the surrounding parts can replicate various embodiments of aircraft or helicopter cockpits, car cockpits, a lorry cockpit etc. The shape of the seat, the external design or also parameter input units 21 can be adapted to the specific application for this purpose. The parameter input units can be implemented for example as joysticks, steering wheels, switches, slides, pedals etc. Depending on the application, head-up displays can also be provided. The cockpit can be closed, or open as represented here. The seat, i.e. retention device 7, is preferably adjustable, so that head 13 of person 8 can be positioned in center 12 of the device. It is however perfectly in accordance with the idea of the invention to position other parts of the body in the center, such as for example the center of gravity of the body or the person's heart. For this purpose, retention device 7 can be constituted longitudinally displaceable, vertically displaceable and optionally also laterally displaceable, as well as rotatable.

The device enables a spatial movement of the person, at least around three rotational axes 4, 5 and 6. First rotational axis 4 corresponds in this embodiment to the yaw axis, second rotational axis 5 corresponds in this embodiment to the pitch axis and the third rotational axis corresponds to the roll axis.

It should be noted that, as a result of rotation of the retention device and the person through 90° around a particular axis, the other two axes change their axial definition. For example, when the retention device and the person are rotated through 90° around the yaw axis, the roll axis becomes the pitch axis and the pitch axis becomes the roll axis. Depending on the control and simulation, the configuration of the axis can thus be changed in a flexible manner. Other axes can also be exchanged by rotation around a particular axis.

Provided on the inner side of hollow body 11 is an image reproduction surface 10. The latter is preferably constituted following the inner side of the hollow body and extends over the entire field of vision, preferably over the entire field of view of person 8. First support element 1 is preferably located outside the field of view of person 8. As a result of this arrangement, only desired parts of the retention device, in particular cockpits parts, parameter input units, head-up displays, as well as the person's own body, the seat and the image reproduction surface are visible to the person. Moving images, in particular computer-generated images of the surroundings, are preferably displayed on image reproduction surface 10. This display can take place by means of projectors, but also by means of other image display devices. Projectors 25 are provided in the present embodiment. The latter project the desired image at least into the field of vision of person 8. The positioning is configured such that the projectors themselves are located outside the field of view and the visual field of the person. The region on which an image is projected preferably corresponds at least to the field of vision of person 8, or to a field that goes beyond the field of vision of the person, so that only irradiated areas are visible to the person even when the head is moved to the extent enabled. In the present embodiment, the projectors are connected fixedly to first support element 1. When this element is rotated around the first rotational axis, the projectors, like the person, also rotate and thus follow the person's field of vision.

Rotary connection devices 22, 23 and 24 are provided for driving the rotations around rotational axes 4, 5, 6. A first rotary drive 26 and a first bearing 29 are provided for the rotation of the first support element. The first rotary drive is preferably constituted as an electric rotary drive, especially as an electric direct drive and/or as a hydraulic drive.

At least one, preferably two, second rotary drives 27 are also provided for the rotation of second support element 2 around the second rotational axis. The latter can be seen in the present representation.

Third support element 3 contains at least a third rotary drive, but preferably two third rotary drives 28. The latter enable the driven rotation with respect to motion device 9. The two rotary drives 27 can also be provided in the third support element. In this embodiment, the drives for the rotation of the second support element with respect to the third support element and the drives for the rotation of the third support element with respect to the motion device would be provided in the third support element.

An embodiment of the represented elements that is as compact as possible is promoted by the present configuration. In order to achieve a realistic simulation for the person, a certain minimum distance from head 13 of person 8 to image reproduction surface 10 is advantageous. The greater this distance, the more realistic the impression on the person of a remote image of distant objects required for the display of the surroundings. On the other hand, image reproduction surface 10 as well as the three support elements and further objects are moved by the motion device. Especially with the embodiment as a one-arm centrifuge or also as a two-arm centrifuge, high accelerations and acceleration forces resulting therefrom occur. The size of the gimbal mounting formed by the three support elements therefore has a direct influence on the dimensioning of motion device 9. A conflict of aims thus arises between a realistic display and a distance that is as large as possible between the head and the image reproduction surface and dimensions of the gimbal mounting that are as compact as possible. Furthermore, it is important for the closeness of the simulation to reality that the support elements lie outside the visual field of the person. With the present invention, the greatest possible distance of the person's head from the image reproduction surface is achieved by the fact that the image reproduction surface is not provided on the innermost (first) support element, but is displaced onto a support element lying farther outwards. In order, however, to achieve the undisturbed simulation, in particular the undisturbed display of the surroundings by means of the image reproduction surface, the first support element, which has a degree of freedom with respect to the image reproduction surface, is disposed bow-shaped outside the field of view of the person. Furthermore, drives 27 and 28 for the rotation around two rotational degrees of freedom are provided in a ring, in the present case in third support element 3. The support elements lying inside the third support element, i.e. the first and the second support element, can thus be constituted more compactly. In particular, in the present embodiment hollow body 11 assumes supporting functions and supports the second support element in terms of strength.

The control of the drives takes place by means of control unit 17 (not represented here). The latter controls or regulates the rotational motion and the rotational position of the drives. Apart from the control by means of simulation models, the person himself can also influence the rotational motion and/or the rotational position of the drives via parameter input units 21.

Figure 3:
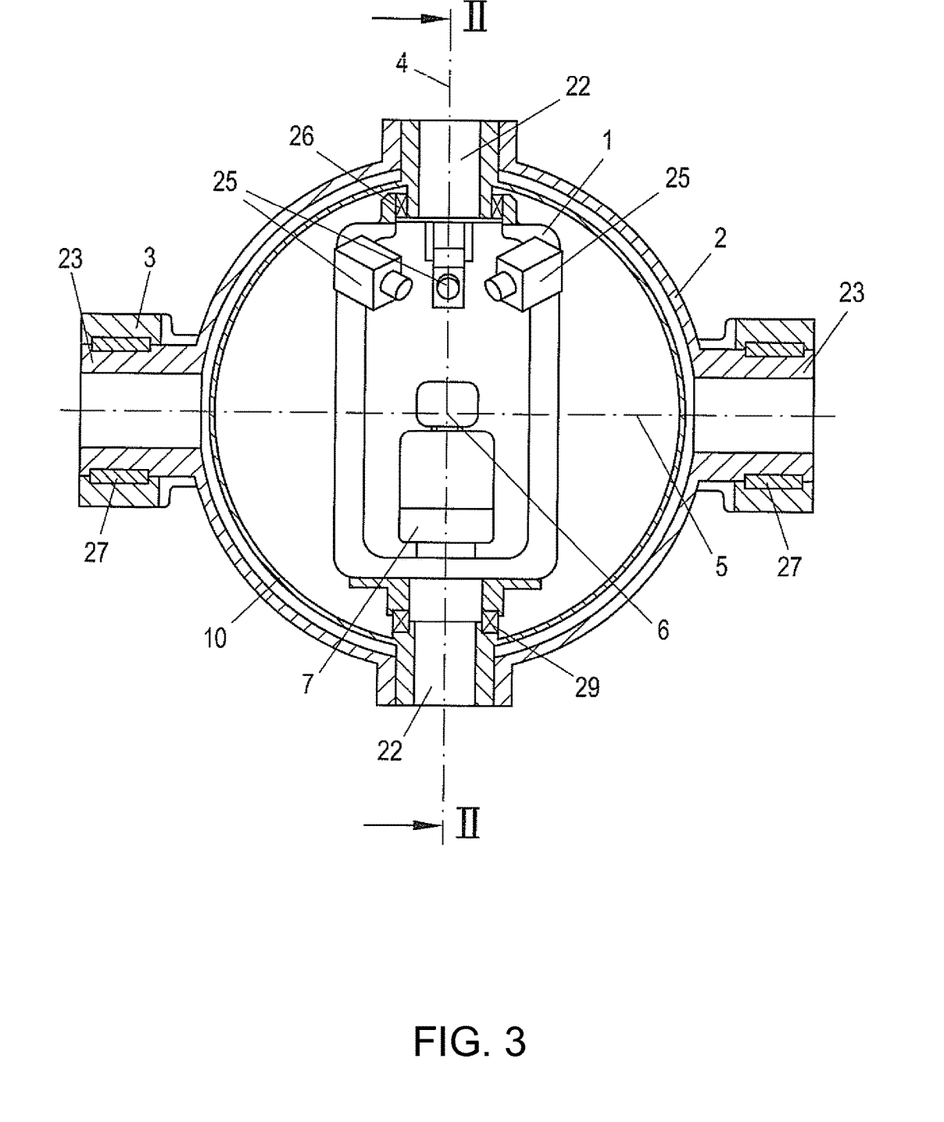
FIG. 3 shows a cross-section of a simulator cabin according to the invention through the sectional plane III-III in FIG. 2, wherein the cross-sectional plane of FIG. 2 II-II is represented in FIG. 3.

FIG. 3 shows a cross-section of an embodiment of the present invention through cross-sectional plane III-III in FIG. 2. Furthermore, cross-sectional plane II-II is represented for the cross-section of FIG. 2. Once again, a first support element 1 is disposed rotatably around a first rotational axis on second support element 2. The second support element is constituted ring-shaped and is disposed around second rotational axis 5 with respect to third support element 3. Two rotary connection devices 23 are provided for the rotation, said rotary connection devices each comprising second rotary drive 27. The latter, as already mentioned in the description in respect of FIG. 2, is provided in the third support element, in particular in the second rotary connection device of the third support element.

First support element 1 is connected via first rotary connection devices 22 to second support element 2. Once again, a first rotary drive 26 and a first bearing 29 are provided. It is however perfectly in accordance with the idea of the invention to dispose two rotary drives. In principle, it is possible to integrate the bearing into the drives themselves or to constitute the drive and the bearing as independent units.

Furthermore, the retention device 7, three projectors 25 and image reproduction surface 10 are represented. Depending on the application and size of the image reproduction surface, it may be advantageous to use more or fewer projectors, but preferably three.

In this embodiment, too, first rotational axis 4 corresponds to the yaw axis, second rotational axis 5 to the pitch axis and third rotational axis 6, represented projecting and therefore as a point, to the roll axis.

Figure 4:
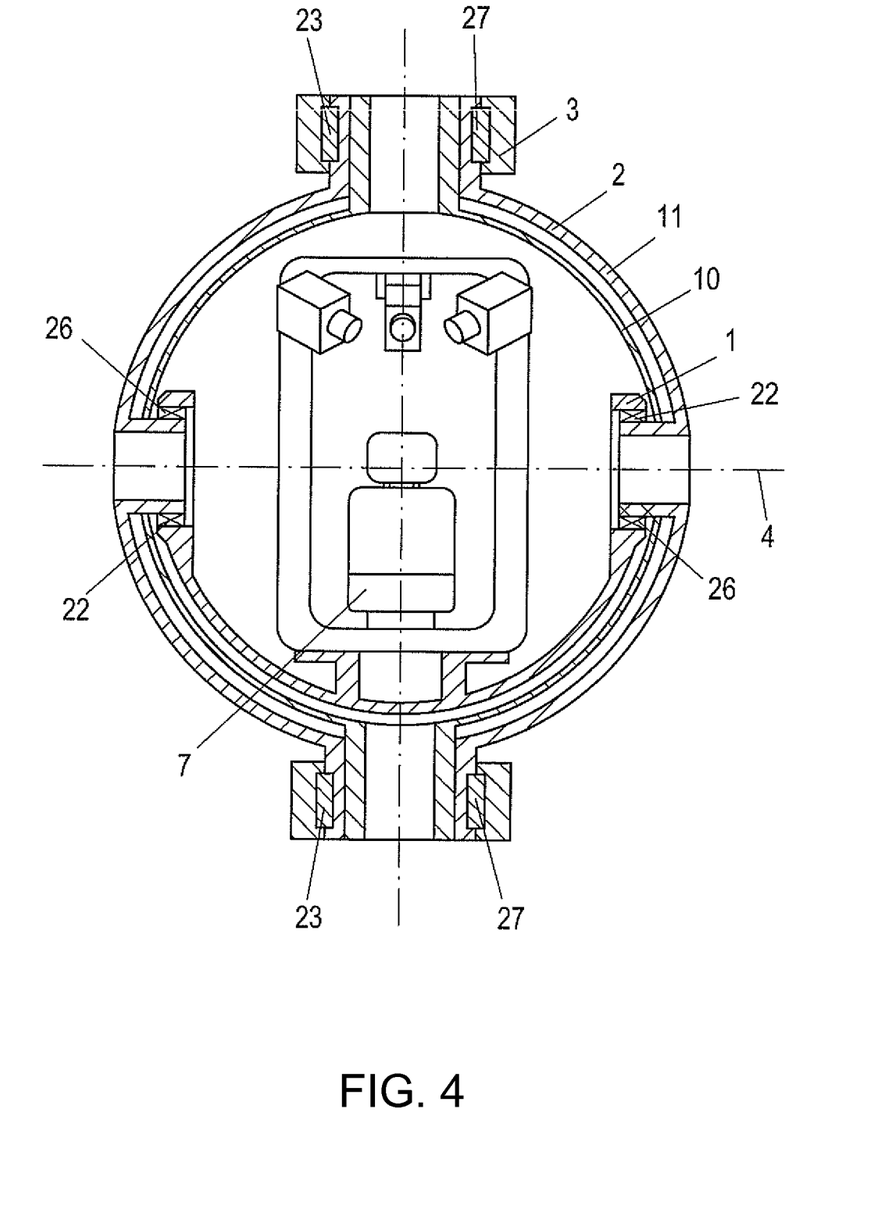
FIG. 4 shows a cross-sectional representation of a further embodiment of the present invention.

FIG. 4 shows a further embodiment, wherein the axis configuration differs from the preceding examples. Once again, a first support element 1 is mounted rotatably around first rotational axis 4 rotatable with respect to second support element 2. First support element 1 extends bow-shaped around retention device 7 and is disposed so as to be rotatable and driveable around the pitch axis. Second support element 2 is constituted ring-shaped and comprises diametrically opposed rotary connection devices, in particular two rotary connection devices 23, disposed along the yaw axis. Rotary connection devices 23 are also, at least partially, a component of the third support element, which is constituted in an annular manner around the image reproduction surface provided on the second support element, said image reproduction surface preferably following the inner side of a hollow body 11. Furthermore, third support element 3 for the rotation with respect to the motion device comprises at least one, preferably two third rotary connection devices 24 which are disposed diametrically opposed and which are not visible on account of the representation. The first support element, which is constituted bow-shaped, also comprises two first rotary connection devices 22 disposed diametrically opposed. The third support element is constituted ring-shaped, wherein the ring is disposed vertically in the basic position.

In the present configuration, the first support element is provided for rotation around the pitch axis, the second support element for rotation around the yaw axis and the third support element for rotation around the roll axis. As is also mentioned in the other embodiments of the invention, the change in the defined axial directions is possible by rotation around rotational axes 4, 5 and 6. The rotary connection devices disposed diametrically opposed, which are also present in the other examples of embodiment, comprise drives 26, 27, 28 and bearings for guiding the rotational motion. In the embodiment according to FIG. 4, parts of the first support element are located in the field of a vision of person 8. In many cases, for example when the field of vision is narrowed due to a helmet or due to non-transparent cockpit elements, this does not however impair the realistic display of the surroundings on the image reproduction surface, since these regions are in any case concealed. In such cases, the first support element is nevertheless outside the person's visual field.

Figure 5:
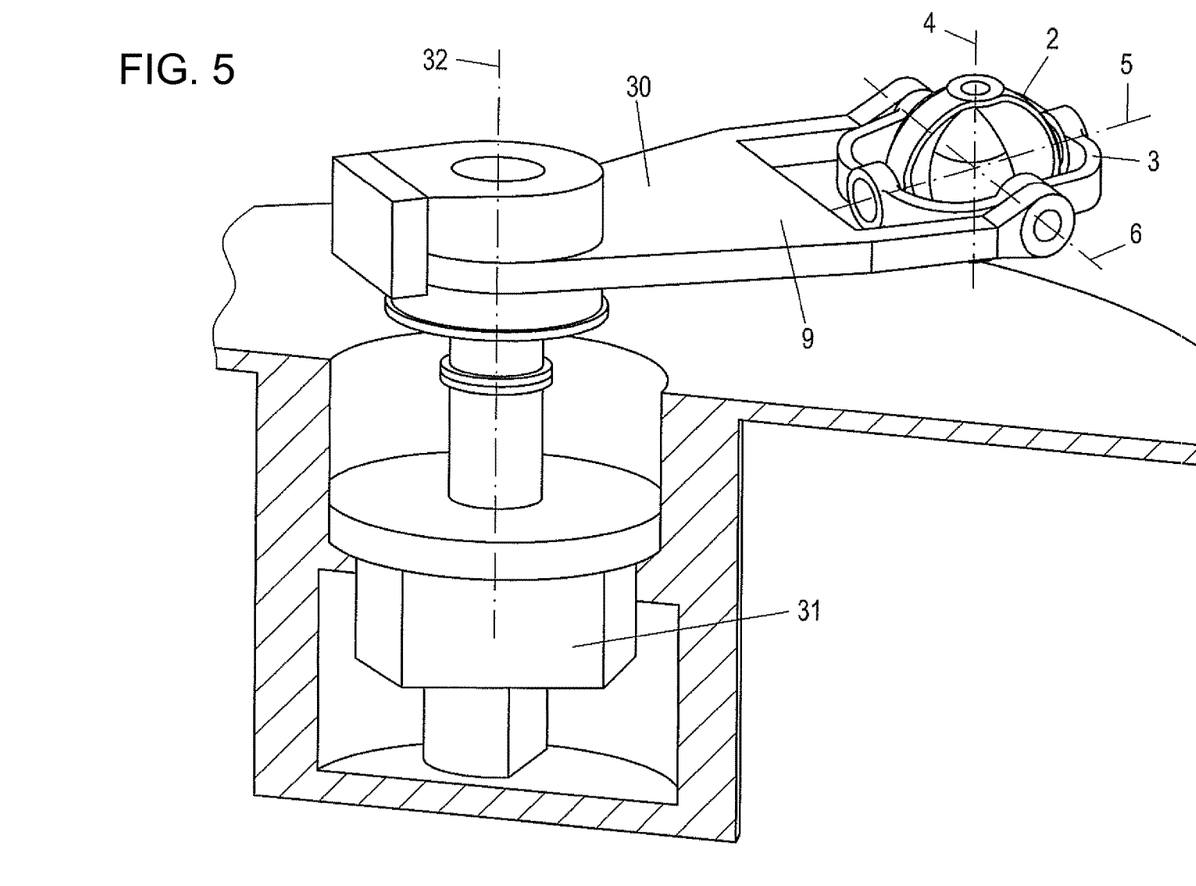
FIG. 5 shows the arrangement of a simulator cabin according to the invention with a one-arm centrifuge.

FIG. 5 shows a device according to the invention for the spatial movement of persons, wherein motion device 9 is constituted as a one-arm centrifuge. The latter comprises a main arm 30, which can be rotated around main rotational axis 32 and driven by means of a main drive 31. Main drive 31 comprises drive motors and coupling elements as well as means for controlling the rotation. Main drive 31 is preferably also controllable by means of control unit 17 and, moreover, can be influenced by the person via parameter input units 21 and by the simulation model. The main drive is essentially used to influence the basic acceleration, comprising gravitational acceleration, centripetal acceleration and tangential acceleration, in its magnitude and variation. This basic acceleration always acts along the resultant of the three acceleration vectors. In order to expose the person to different acceleration states, retention device 7 and therefore also person 8 can be rotated around three rotational axes 4, 5, 6. Furthermore, the impression of motion and/or acceleration is assisted by projection or display of images of the surroundings on image reproduction surface 10, as a result of which almost real motion sequences can be simulated for the observing person.

Such motion sequences can for example be flight situations, driving situations in cars, but also loading tests etc. The simulation models upon which the simulation is based are preferably calculated by means of a data-processing device, such as for example a computer.

In the present configuration, third support element 3 is disposed rotatably around third rotational axis 6 rotatable with respect to motion device 9.

Second support element 2 is also disposed rotatably, i.e. around second rotational axis 5, on third support element 3. These two rotational axes correspond to two degrees of freedom, wherein the third degree of freedom is provided by the ability of first support element 1 to rotate around first rotational axis 4.

Main drive 31 and the necessary bearings and structural equipment are represented diagrammatically, disposed sunk in a foundation.

According to a further embodiment (not represented), the third support element is connected fixedly to the motion device, for example with an arm of a one-arm centrifuge. The support element can thus also be a part of the arm on which at least one of the remaining support elements is disposed rotatably.

Figure 6:
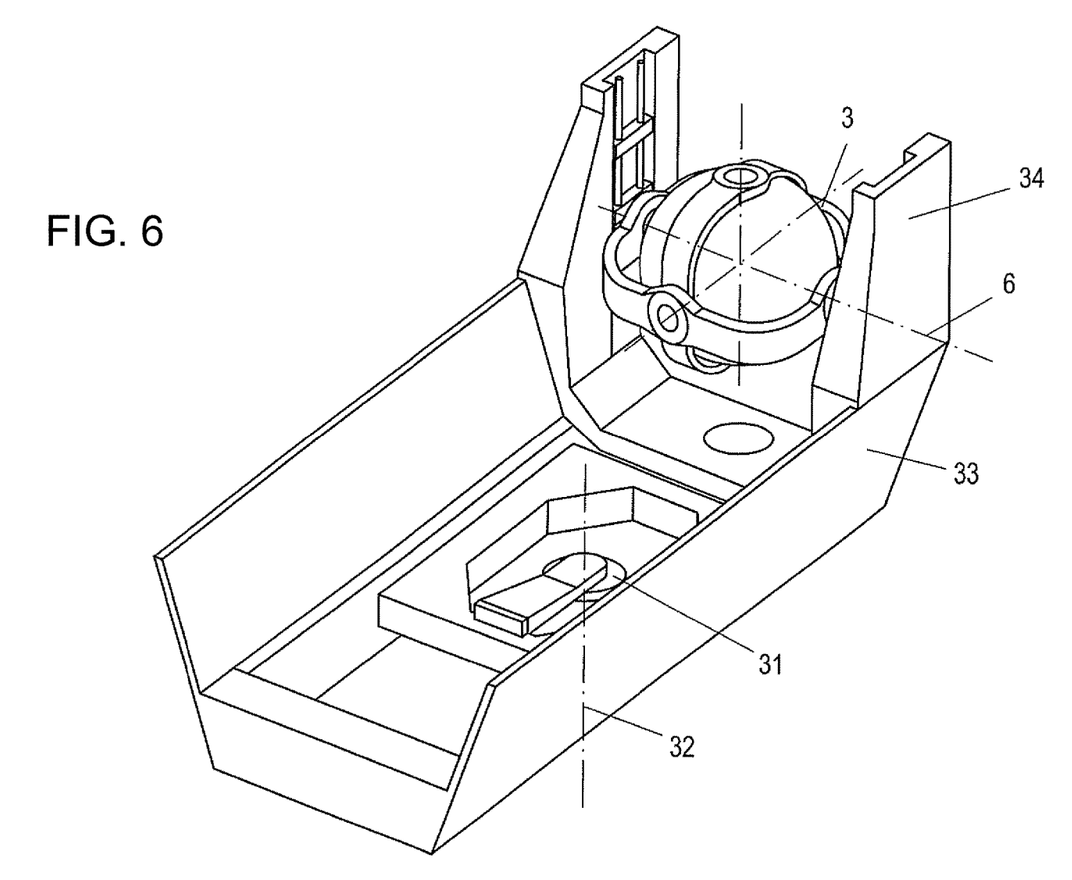
FIG. 6 shows an arrangement of a simulator cabin according to the invention on a two-arm centrifuge.

FIG. 6 shows a further embodiment of the device according to the invention. The three support elements 1, 2, 3 are provided on a heave carriage. The latter is disposed displaceably in carriage basket 33 and can be traversed on both sides of main rotational axis 32. Carriage basket 33 of the two-arm centrifuge is rotatable around main axis 32 and driven rotatably by a main drive 31.

As a result of this configuration, it is also possible to vary the resultant acceleration by changing the distance of the person from main rotational axis 32 with a constant angular velocity of main drive 31. In addition to these degrees of freedom, third support element 3 is rotatable around third rotational axis 6 and connected in any driveable manner to the heave carriage. Moreover, the heave carriage comprises a drive for the translatory displacement of the support element, wherein the direction of the drive of this vertical lift essentially runs parallel to main rotational axis 32. Apart from the three degrees of rotational freedom around rotational axes 4, 5 and 6, the person can thus also be moved in a translatory manner parallel to main rotational axis 32, in a translatory manner along carriage basket 33 and rotatably around main rotational axis 32. The direction of the translatory motion of the heave carriage in the carriage basket roughly follows a straight line, which runs normal to main rotational axis 32 and normal to third rotational axis 6.

Accelerations and their Variations can be Influenced by Various Motion sequences:

Acceleration by a Rotation of the Carriage Basket:

The carriage basket is thereby rotated around its rotational axis, wherein it projects on both sides beyond this rotational axis. The heave carriage is disposed in a linearly displaceable manner on this carriage basket. If this heave carriage is located precisely over the rotational axis of the rotating carriage basket, no further accelerations act on the person apart from gravitational acceleration. Although the user rotates, he perceives this state essentially as a motionless state, since he does not have the visual stimuli of rotation in the closed-off hollow body, i.e. due to the concealment of the entire field of view outside.

If the heave carriage moves away from the rotational axis, the radial acceleration increases with the distance from the rotational axis. The resultant acceleration comprising gravitational acceleration and radial acceleration is perceived by the user. If the heave carriage moves back again and if it crosses the rotational axis of the carriage basket, the user experiences a change in the orientation of the radial acceleration. Depending on the travel velocity of the heave carriage, a Coriolis acceleration also arises.

In order to vary this resultant acceleration in its magnitude, either the angular velocity of the carriage basket can be varied or the heave carriage can be traversed variably farther outwards.

Acceleration by Translatory Motion:

The change in linear velocity of the heave carriage along the carriage basket by the inventive translatory, essentially linear motion and the change in the linear velocity of the support elements by means of the vertical lift are further possibilities for exerting accelerations on the user.

Change in the Direction of the Acceleration:

In order to change the resultant acceleration acting on the body, it is advantageous to move the body of the person himself, in order thus to create, for example, the impression of a change in the acceleration direction or the acceleration component amplitude. This takes place with the aid of rotations of the support elements around rotational axes 4, 5, 6, which in all the examples of embodiment are referred to as a gimbal mounting. The retention device and therefore the body of the person can be rotated arbitrarily by means of these degrees of rotational freedom. In addition, the entire gimbal mounting is disposed rotatably on a vertical lift.

A series of drives are provided to move the elements of the device according to the invention. The manipulated variables for these drives can either be calculated from the physical simulation model or can be preselected by a control center. The generation of the audiovisual stimuli can also either be produced from a physical simulation model or follow a fixed sequence.

The rotational axis of the carriage basket runs vertical.

The movement of the heave carriage in the carriage basket takes place along a straight line, wherein the straight line runs orthogonal to the rotational axis of the carriage basket and has a common point of intersection with it. The motion direction of the vertical lift is again normal to the straight motion line of the heave basket and thus parallel to the rotational axis of the carriage basket. The rotational axis of the gimbal mounting related to the vertical lift runs tangential to the orbit of the carriage basket and therefore horizontal and normal to the motion direction of the vertical lift.

Figure 7:
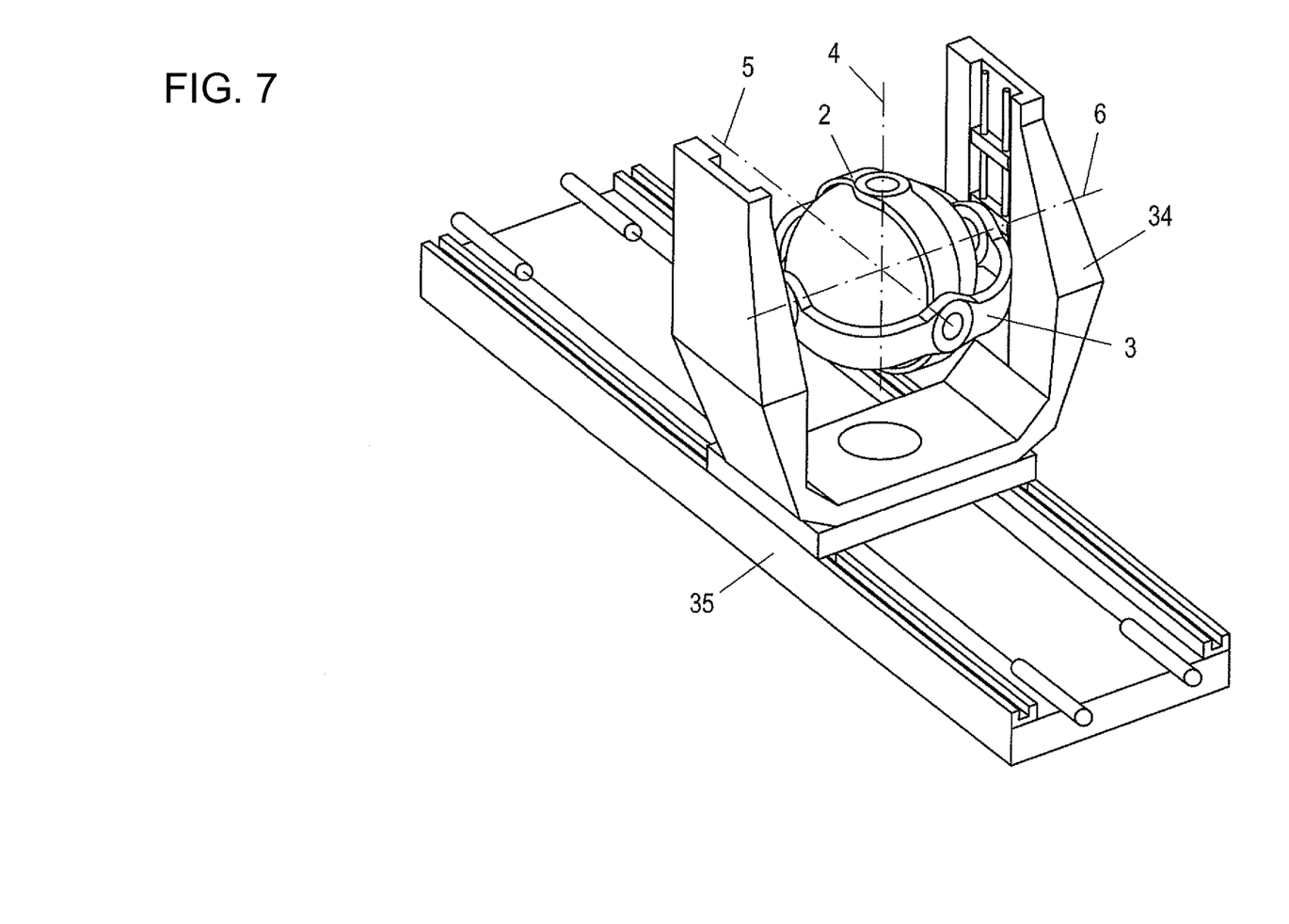
FIG. 7 shows an arrangement of a simulator cabin according to the invention with a carriage disposed longitudinally displaceable.

FIG. 7 shows a further possible embodiment of the device according to the invention for the spatial movement of persons. A heave carriage is provided, which can be moved in a translatory manner. This configuration corresponds in the broadest sense to the configuration from FIG. 6, that instead of a rotatably mounted carriage basket 33, a fixedly disposed carriage guide 35 is provided. The heave carriage is disposed on this carriage guide in a traversable and driveable manner. The heave carriage again has a translatory degree of freedom, which lies roughly normal to the direction of the carriage guide. Third support element 3 is disposed on the latter, again rotatable around the third axis. Second support element 2 is again disposed rotatably with respect to the third support element and is fixedly connected to hollow body 11. Located inside this hollow body 11 is first support element 1, which is constituted rotatable around first rotational axis 4 with respect to the second support element. The first support element is again connected to retention device 7 for a person 8. The represented embodiment is particularly well suited for longitudinal dynamic simulations and/or transverse dynamic simulations, in particular for driving simulations in the automotive sector, such as for example roadway changes or overtaking maneuvers.

Figure 8:
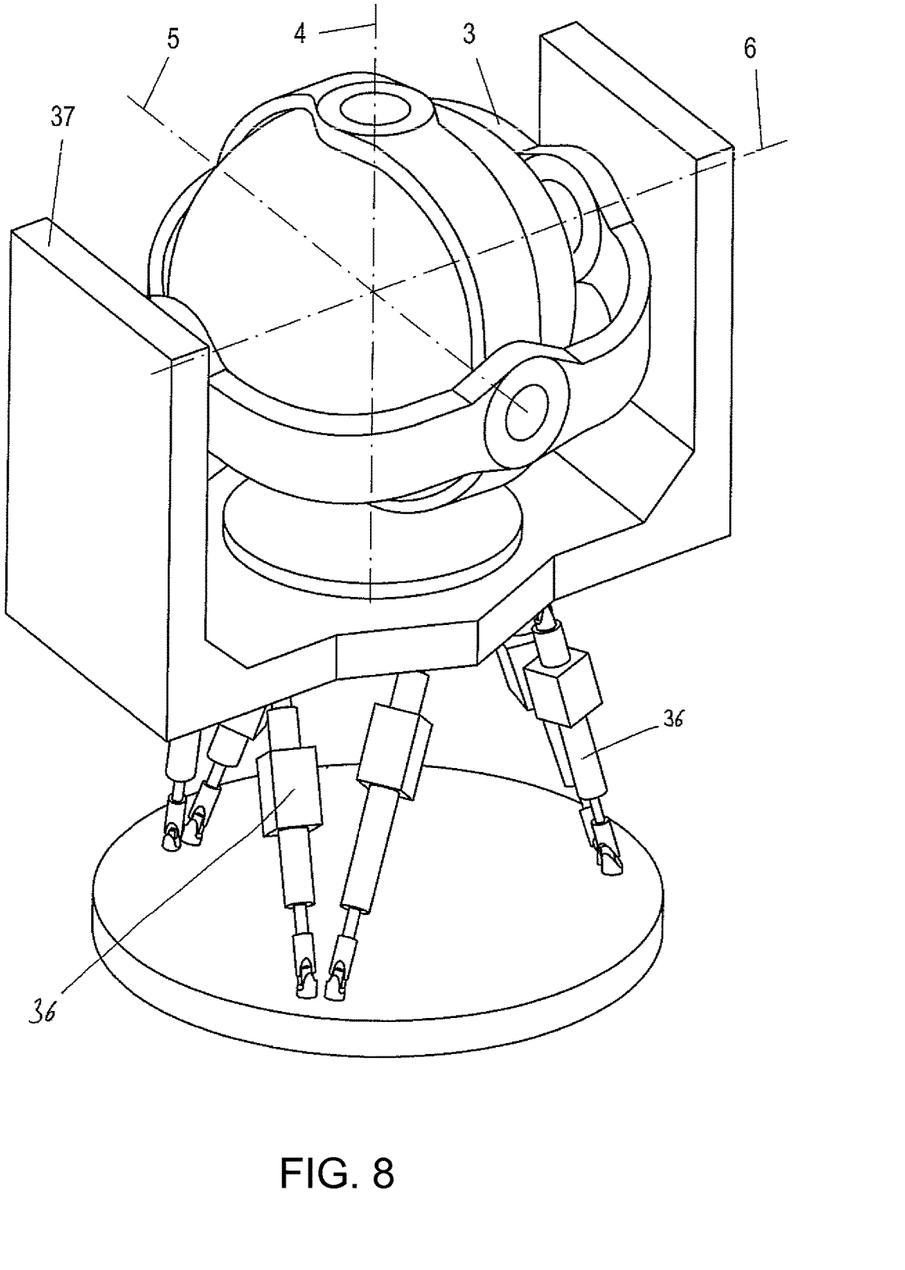
FIG. 8 shows the simulator cabin according to the invention in combination with a hexapod.

FIG. 8 shows a further embodiment of the present device. Retention device 7 for person 8 can be moved by means of a hexapod, said retention device being disposed rotatable around the three rotational axes. The hexapod comprises six linear motion devices 36, which can be controlled and changed in their length. The inclination of retention device 37 can be varied in several axes by the controlled change of the lengths of the individual linear motion devices. Third support element 3 is again disposed rotatably on retention device 37. The configuration of the first and second support elements and of hollow body 11 can be constituted according to one of the preceding examples of embodiment. Furthermore, retention device 37 of the third support element can be disposed with respect to the hexapod so as to be rotatable in an unlimited manner, wherein the rotational axis in the basic position runs essentially vertical and can be inclined by the motion of linear motion devices 36.

According to a further embodiment (not represented), retention device 7 for at least one person 8 is mounted in a rotatable and driveable manner only around two rotational axes, apart from the degrees of freedom of the motion device. Possible motion devices 9 are for example 1-arm centrifuges, wherein the third support element is rigidly connected to the motion device. As a possible embodiment, the first support element is disposed rotatably around the pitch axis and the second support element rotatably around the roll axis. The basic kinematic configuration corresponds to a conventional 1-arm centrifuge, wherein the person is positioned tangentially in the rotation direction looking around a main rotational axis 32 of a main arm 30. In the present invention, moreover, image reproduction surface 10 is provided on second support element 2 and is fixedly connected to the latter. Retention device 7, which is connected to first support element 1, has a degree of rotational freedom with respect to second support element 2 and therefore image reproduction surface 10, which is preferably constituted following the inner side of hollow body 11. Hollow body 11 itself can, as in the preceding examples of embodiment, assume self-supporting and stiffening functions and/or can be constituted as an independent body constructed with a lightweight design. As a result of the provision of the image reproduction surface on the second support element, the display plane of the images is positioned in a location distant from the observer, as a result of which the impression of the display of distant surroundings is improved. Once again, the problem according to the invention is solved by the fact that, despite the greater spacing of the image reproduction surface and the person's eye, the size can be kept compact. In this embodiment, therefore, third rotational axis 6 is absent, or this rotational axis is present, but blocked against rotation. The third support element can be connected rigidly to the motion device or can also be integrated into the motion device, for example into the arm of a 1-arm centrifuge.

A further embodiment (not represented) essentially corresponds to that of FIG. 8, but no hexapod motion device is provided. On the contrary, retention device 37 is rigidly connected to the base. In this embodiment, a rotation of the person is possible around three rotational axes which intersect in center 12 in the region of the head.

In combination with one- or multi-arm centrifuges, a further feature essential to the invention is that positioning of the person with a radial direction of vision in the basic position is enabled by the rotatable arrangement of the retention device around three rotational axes during the simulation. If a non-accelerated or almost static motion, or a motionless, static state is simulated for the person, the main arm of the motion device rotates at a constant, relatively slow velocity around main axis 32. The person is fastened in with a seatbelt on the retention device and is essentially looking radially outwards or radially inwards, i.e. either towards main rotational axis 32 or away from main rotational axis 32. The person experiences a slightly increased, constant basic acceleration, which however is essentially not perceived by the person as being increased after a short adaptation phase. In order, for example, to simulate a start-up acceleration of a vehicle, the person is rotated around the pitch axis, as a result of which the resultant of the gravitational acceleration and radial acceleration with respect to the position of the person's body is changed. In the basic position, the resultant acceleration acts for example downwards, i.e. along the yaw axis. By rotating the person around the pitch axis, accelerations such as start-up accelerations or braking accelerations of a linearly moving vehicle can thus be simulated. The person's direction of vision with constant rotation of the motion device is always radially inwards or radially outwards. The occurring overall acceleration is achieved by the control of the rotation velocity around main rotational axis 23. In order to simulate lateral accelerations, the retention device with the person can be rotated around the roll axis.

A further embodiment relates to a device for the spatial movement of persons comprising: a first support element 1, which comprises a retention device 7 for at least one person 8 and is disposed rotatably around a first rotational axis 4 with respect to a second support element 2; a second support element 2, which is disposed rotatably around a second rotational axis 5 with respect to a third support element 3, wherein first rotational axis 4 and second rotational axis 5 are disposed essentially orthogonal to one another; and an image reproduction surface 10; wherein image reproduction surface 10 is provided on second support element 2, on third support element 3 or on motion device 9 and wherein retention device 7 has at least one degree of rotational freedom permitting a rotation of at least 10°, 20°, 30°, 45°, 90°, 180° or 360° with respect to image reproduction surface 10.

A further embodiment relates to a similar device for the spatial movement of persons comprising: a first support element 1, which comprises a retention device 7 for at least one person 8 and is disposed rotatably around a first rotational axis 4 with respect to a second support element 2; a second support element 2, which is disposed rotatably around a second rotational axis 5 with respect to a third support element 3, wherein first rotational axis 4 and second rotational axis 5 are disposed essentially orthogonal to one another; a third support element 3, which is disposed rotatably around third rotational axis 6 with respect to a motion device 9, wherein second rotational axis 5 and a third rotational axis 6 are disposed essentially orthogonal to one another; and an image reproduction surface 10; wherein image reproduction surface 10 is provided on second support element 2 and is connected to the latter.

It should be pointed out at this point that the reproduction surface is referred to as a surface, but can also comprise a plurality of surfaces joined together. All the represented embodiments and all the embodiments that emerge in an obvious way for the person skilled in the art comprise at least one retention device 7 for a person 8, an image reproduction surface, at least one drive which can be controlled by at least one control unit. Regarding the control unit, it is possible in all the examples of embodiment for simulation models, but also the person himself, to influence the control unit via a parameter input unit 21. In the present embodiments, retention device 7 is preferably constituted as a seat, in particular as a seat with fastening means such as a belt.

The three rotational axes 4, 5 and 6 or, in embodiments with only two degrees of freedom, axes 4 and 5 intersect at a point. It may however be advantageous to position the axes at a certain normal distance from one another. This normal distance can preferably amount to the smallest distance between an eye and an organ of equilibrium of the person.

Furthermore, the various embodiments of FIG. 1, FIG. 2, FIG. 3 and FIG. 4 can be combined with the respective motion devices of FIGS. 5 to 8 and with the motion devices not represented.

Moreover, it should be noted that the invention is not limited to the mentioned examples of embodiment. Further embodiments corresponding to the idea of the invention also arise from combinations of individual or several features which can be derived from the description as a whole, the figures and/or the claims. Thus, embodiments are also disclosed that comprise combinations of features originating from different examples of embodiment. The figures are at least in part diagrammatic representations, wherein the dimensions and proportions may diverge from other embodiments or features not depicted in drawings and from real embodiments.

1. first support element
2. second support element
3. third support element
4. first rotational axis
5. second rotational axis
6. third rotational axis
7. retention device
8. person
9. motion device
10. image reproduction surface
11. hollow body
12. center
13. head
14. field of vision
15. opening.
16. closure
17. control unit
21. parameter input unit
22. first rotary connection device
23. second rotary connection device
24. third rotary connection device
25. projector
26. first rotary drive
27. second rotary drive
28. third rotary drive
29. first bearing
30. main arm
31. main drive
32. main rotational axis
33. carriage basket
34. heave carriage
35. carriage guide
36. linear motion device
37. retention device

The invention claimed is:

1. A device for a spatial movement of persons, comprising:
   a motion device configured as a centrifuge selected from the group consisting of a one-arm centrifuge, a centrifuge with a traversable carriage, a centrifuge with a traversable heave carriage, a two-arm centrifuge with a carriage traversable on both sides, and a two-arm centrifuge with a heave carriage traversable on both sides;
   a first support element, a second support element, and a third support element;
   said first support element being an innermost support element of said first, second, and third support elements and having a retention device for at least one person and being rotatably disposed about a first rotational axis with respect to said second support element;
   said second support element being rotatably disposed about a second rotational axis with respect to said third support element, said first and second rotational axes extending substantially orthogonal to one another; and
   an image reproduction surface being provided on said second or third support element;
   said first support element and said retention device having a degree of rotational freedom with respect to said image reproduction surface, said first, second and third support elements and said motion device, in every arbitrary rotational location and position, being located outside a visual field of the person retained in said retention device.

2. The device according to claim 1, wherein said retention device has a degree of rotational freedom permitting a rotation of more than 45°, 90°, 180° or 360° with respect to said image reproduction surface.

3. The device according to claim 1, wherein said first support element is rotatably disposed around a third rotational axis with respect to said motion device, and wherein said second rotational axis and said third rotational axis are disposed substantially orthogonal to one another.

4. The device according to claim 1, wherein said third support element is connected rigidly to said motion device.

5. The device according to claim 1, wherein said image reproduction surface is disposed on said second support element and is connected thereto or said image reproduction surface and said hollow body are connected fixedly to said second support element.

6. The device according to claim 1, wherein said rotational axes run substantially through a center and a body of the person retained in said retention device is located at the center.

7. The device according to claim 6, wherein the head of the person, a center of gravity of the body of the person, or the heart of the person is located in the region of the center.

8. The device according to claim 1, wherein said image reproduction surface is formed substantially following an inner side of a hollow body concavely curved around said retention device, at least one of said hollow body or said image reproduction surface having a substantially closed shape.

9. The device according to claim 8, wherein said image reproduction surface is formed as a hollow sphere, as a hollow ellipsoid, segmented in a hollow-body shape or a hollow-sphere shape, and said image reproduction surface is fixedly connected to said hollow body or the inner side of said hollow body is said image reproduction surface.

10. The device according to claim 1, wherein said image reproduction surface is configured as a reflecting image reproduction surface reflecting an image from one or more projectors or a flat display screen surface.

11. The device according to claim 1, wherein said image reproduction surface is an OLED display screen surface, a plasma display screen surface, or an LCD display screen surface.

12. The device according to claim 8, wherein the hollow body is formed with an opening for providing ingress and egress to persons and wherein a closure is disposed for closing said opening and, upon closing, for completing a shape of the hollow body.

13. The device according to claim 1, which comprises at least one control unit and at least one drive for a rotation of the support elements around their respective rotational axes and for driving said motion device, said at least one drive being controllably connected to said control unit, and at least one parameter input unit for enabling the person to influence said control unit, for controlling a motion of the support elements and said motion device.

14. The device according to claim 1, wherein said image reproduction surface is disposed with at least one degree of freedom relative to said motion device.

15. The device according to claim 1, wherein said retention device has at least one fixable degree of freedom with respect to said first support element.

16. The device according to claim 1, wherein said second support element is ring-shaped, closed hollow-body shaped, or partially closed hollow-body shaped, and wherein said first support element is connected rotatably about said first rotational axis to said second support element at one or two points.

17. The device according to claim 1, wherein said third support element is ring-shaped, closed hollow-body shaped, or partially closed hollow-body shaped, and wherein said second support element is connected rotatably about said second rotational axis to said third support element at one or two points.

18. The device according to claim 1, wherein said third support element is connected rotatably about said third rotational axis to said motion device at one or two points.

19. The device according to claim 1, wherein one of the following is true:
   said first rotational axis is a pitch axis, said second rotational axis is a yaw axis, and said third rotational axis is a roll axis; or
   said first rotational axis is the yaw axis, said second rotational axis is the roll axis, and said third rotational axis is the pitch axis; or
   said first rotational axis is the pitch axis, said second rotational axis is the roll axis, and said third rotational axis is the yaw axis; or
said first rotational axis is the roll axis, said second rotational axis is the pitch axis, and said third rotational axis is the yaw axis.

* * * * *